United States Patent [19]

Gubser

[11] Patent Number: 4,745,627
[45] Date of Patent: May 17, 1988

[54] PROCEDURE AND CIRCUIT FOR DETECTION OF THE INFORMATION OF A RECEIVED SIGNAL

[75] Inventor: Andrea Gubser, Dietlikon, Switzerland

[73] Assignee: Gesellschaft zur Forderung der Industrieorientierten Forschung an den Schweizerischen Hochschulen und Weiteren Institutionen, Bern, Switzerland

[21] Appl. No.: 905,388
[22] PCT Filed: Dec. 4, 1985
[86] PCT No.: PCT/CH85/00171
§ 371 Date: Aug. 7, 1986
§ 102(e) Date: Aug. 7, 1986
[87] PCT Pub. No.: WO86/03643
PCT Pub. Date: Jun. 19, 1986

[30] Foreign Application Priority Data

Dec. 7, 1984 [CH] Switzerland ............. 5815/84

[51] Int. Cl.⁴ .................................. H04L 27/22
[52] U.S. Cl. .......................... 375/88; 329/50
[58] Field of Search ............. 375/50, 77, 88, 39; 329/50, 124, 145

[56] References Cited

U.S. PATENT DOCUMENTS 3,826,990  7/1974  Pera ........................... 329/50
4,285,062  8/1981  Yoshida ....................... 375/39
4,347,616  8/1982  Murakami ..................... 375/39
4,470,145  9/1984  Williams ...................... 375/77
4,475,219 10/1984  Puckette ...................... 375/82
4,509,135  4/1985  Parker ........................ 375/77
4,612,509  9/1986  Betts et al. .................. 375/88
4,618,967 10/1986  Vance et al. .................. 375/88

FOREIGN PATENT DOCUMENTS 0076095  4/1983  European Pat. Off. .
1190495  4/1965  Fed. Rep. of Germany .
1172975 12/1969  United Kingdom .
2057820  4/1981  United Kingdom .
2124046  2/1984  United Kingdom ............... 375/88

Primary Examiner—Robert L. Griffin
Assistant Examiner—Stephen Chin
Attorney, Agent, or Firm—Watson, Cole et al.

[57] ABSTRACT

Two phase-shifted quadrature signals are formed from a reception signal modulated by frequency-shift keying. Instant values of one of the quadrature signals are taken at the instant when the other quadrature signal passes through zero and vice-versa. The readout values obtained during an interval of one data bit are alternatingly inverted in their polarity or left unchanged, so that a sequence of readout values of adapted polarity is formed. The values are algebraically added in an added during each of the bit intervals. The sign of the resultant sum determines the evaluated value of the received information symbol '0' or '1' and the amount of the sum is a measure of the quality of the evaluation.

14 Claims, 2 Drawing Sheets

PROCEDURE AND CIRCUIT FOR DETECTION OF THE INFORMATION OF A RECEIVED SIGNAL

BACKGROUND OF THE INVENTION

1. Field of the Invention

The present invention concerns a procedure for detection of the information of a received signal, as well as an electric circuit for implementing the procedure. Preferentially, the invention will serve to estimate a binary information item in a received signal modulated by frequency shift-keying (FSK).

2. Related Art

Various circuits for the reception of signals modulated by frequency shift-keying (FSK) are already known. The traditional incoherent circuits accumulate the energy of the received signal in each case for one bit period on the two frequencies $F_0$ and $F_1$, which represent the two binary symbols '0' and '1.' The frequency which, in each case, has the higher signal energy, provides the estimation value of the corresponding information symbol. These classical receivercircuits are explicitely described, e.g., by John M. Wozencraft and Irwin M. Jacobs in the book *Principles of Communicatons Engineering*, John Wiley and Sons, New York, 1965. These known circuits are theoretically optimal; however, in their practical application, they are very susceptible to non-ideal characteristics of the oscillators and filters, as well as deviation of broadcast frequencies from their ideal values.

SUMMARY OF THE INVENTION

The problem for the present invention is to enable the detection of the information of a received signal in a relatively simple matter and with relatively minimal energy utilization, even under non-ideal conditions, particularly if the received signal has a considerable portion of undesirable interference overriding the useful signal representing the information, e.g., static and signal interference.

BRIEF DESCRIPTION OF THE DRAWINGS

In the following description, the invention is explained in greater detail by reference to the attached drawings, purely as an example.

DETAILED DESCRIPTION

Figure 1:
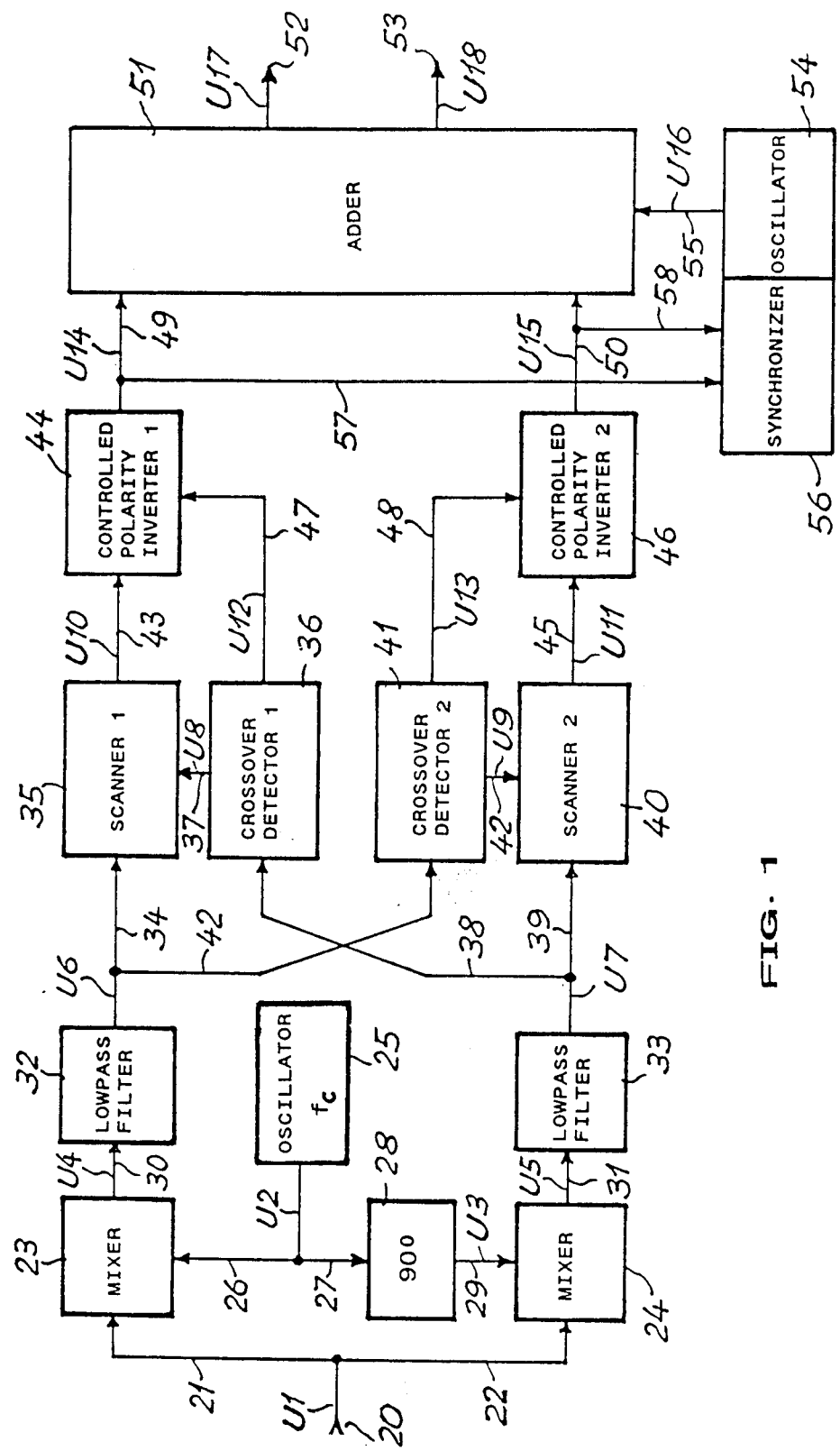
FIG. 1 shows schematically a circuit for detecting binary information in a received signal modulated by frequency shift-keying (FSK)

The circuit represented in FIG. 1 provides a signal input 20 for the possibly preamplified high-frequency received signal U1 which is modulated by frequency shift keying (FSK) between 2 frequencies $f_0$ and $f_1$. the signal input 20 is connected by means of wires 21 and 22 to the input of an initial mixer 23 and input to a second mixer 24. An oscillator 25 generates a sinusoidal oscillation with a constant center frequency of:

$$f_c = \frac{(f_0 + f_1)}{2},$$

and is connected by means of a wire 26 with a second input of the initial mixer 23, and by a wire 27 with a phase-displacement device 28. At the output of the phase-displacement device 28, there is a sinusoidal oscillation U3, which is phase-shifted by 90° in relation to the sinusoidal oscillation U2, and has the same frequency, $f_c$. The oscillation U3 is passed by means of a wire 29 to a second input of the second mixer 24. The two mixers 23 and 24 generate mixed products U4 and U5, which are each passed by way of wires 30 and 31, respectively, to an initial low-frequency pass filter 32, and a second low-frequency pass filter 33, respectively. At the outputs of the two low-frequency pass filters 32 and 33 are two sinusoidally-progressing quadrature signals U6 and U7, which both have the deviation frequency:

$$\Delta f = \frac{(f_0 - f_1)}{2},$$

but which are phase-shifted by 90° in relation to one another. The described transformation of the received signal U1 to a low-frequency band in a single step is known as direct conversion.

The first quadrature signal U6 is passed by means of a wire 34 to an instantaneous value-sampler 35, which is controllable by an electrical signal U8. The latter is generated by a crossover detector 36, and delivered by way of a wire 37 to a control input of the sampler 35. The second quadrature signal U7 is passed by way of a wire 38 to the input of crossover detector 36. The sampler 35 and the crossover detector 36 are made in such a way that at each crossover of the second quadrature signal U7, a sampling of the instantaneous value of the first quadrature signal U6 occurs. In a completely analogous manner, the second quadrature signal U7 is passed by way of a wire 39 to a second instantaneous sampler 40 which is controllable by an electrical control signal U9. The latter is generated by a second crossover detector 41 and is passed by way of a wire 42 to a control input of the second sampler 40. The first quadrature signal U6 is passed by way of a wire 42 to the input of second crossover detector 41. The second sampler 40 and the second crossover detector 41 are made in such a way that at each crossover of the first quadrature signal U6, a sampling of the instantaneous value of the second quadrature signal U7 occurs.

The sequence of samples U10 generated by the first sampler 35 is passed by way of a wire 43 to a controlled polarity inverter 44, and the sequence of scan values U11 generated by the second sampler 40 is passed by way of a wire 45 to a second controlled polarity inverter 46. The first crossover detector 36 is furthermore made so that it generates a control signal U12 in each case when a second quadrature signal U7 crosses a zero-point in a certain direction, e.g., from minus to plus. This control signal U12 is passed by way of a wire 47 to a control input of the first polarity inverter 44. Similarly, the second crossover detector 41 is made so that it generates a control signal U13 in each case when the quadrature signal U6 crosses a zero-point in the opposite direction, e.g., from plus to minus, and this control signal U13 is passed by way of a wire 48 to a control input of the second polarity inverter 46. Accordingly, the control of the two polarity inverters 44 and 46 occurs according to mutually opposite rules. At the outputs of the polarity inverters 44 and 46, sequences of samples U14 and U15, respectively, appear with adapted polarities, as is to be explained below.

The outputs of the polarity inverters 44 and 46 are connected by means of wires 49 and 50 with two inputs of an adder 51, which is controllable by means of a timing signal U16, and has two signal outputs 52 and 53. The adder 51 is in addition made so that during each period of time controlled by the timing signal U16, it algebraically adds the input scan values U14 and U15, and then outputs an electrical signal U17 at the signal exit 52 which corresponds to the digit sign of the sum obtained; and outputs at the signal exit 53 an electrical signal which corresponds to the amount of the sum. In order to generate the timing signal U16 for controlling the adder 51, an oscillator 54 is present whose output is connected by way of a wire 55 with a control input of the adder 51. A synchronizer 56 is provided for the oscillator 54, the former having two signal entries which are connected by way of wires 57 and 58 with the outputs of the polarity inverters 44 and 46. The synchronizer 56 contains, for this purpose, a phase correction estimator which is capable of comparing the phase of the oscillator 54 with the time of the frequency shift keying of the received signal U1, and of correcting towards zero any deviations which occur by means of corresponding effect on the oscillator 54. Preferentially, the oscillator 54 is a quartz oscillator whose oscillation period is set to uniform time intervals, established from the emission side, between two points in time in which frequency shift keyings are possible.

Figure 2:
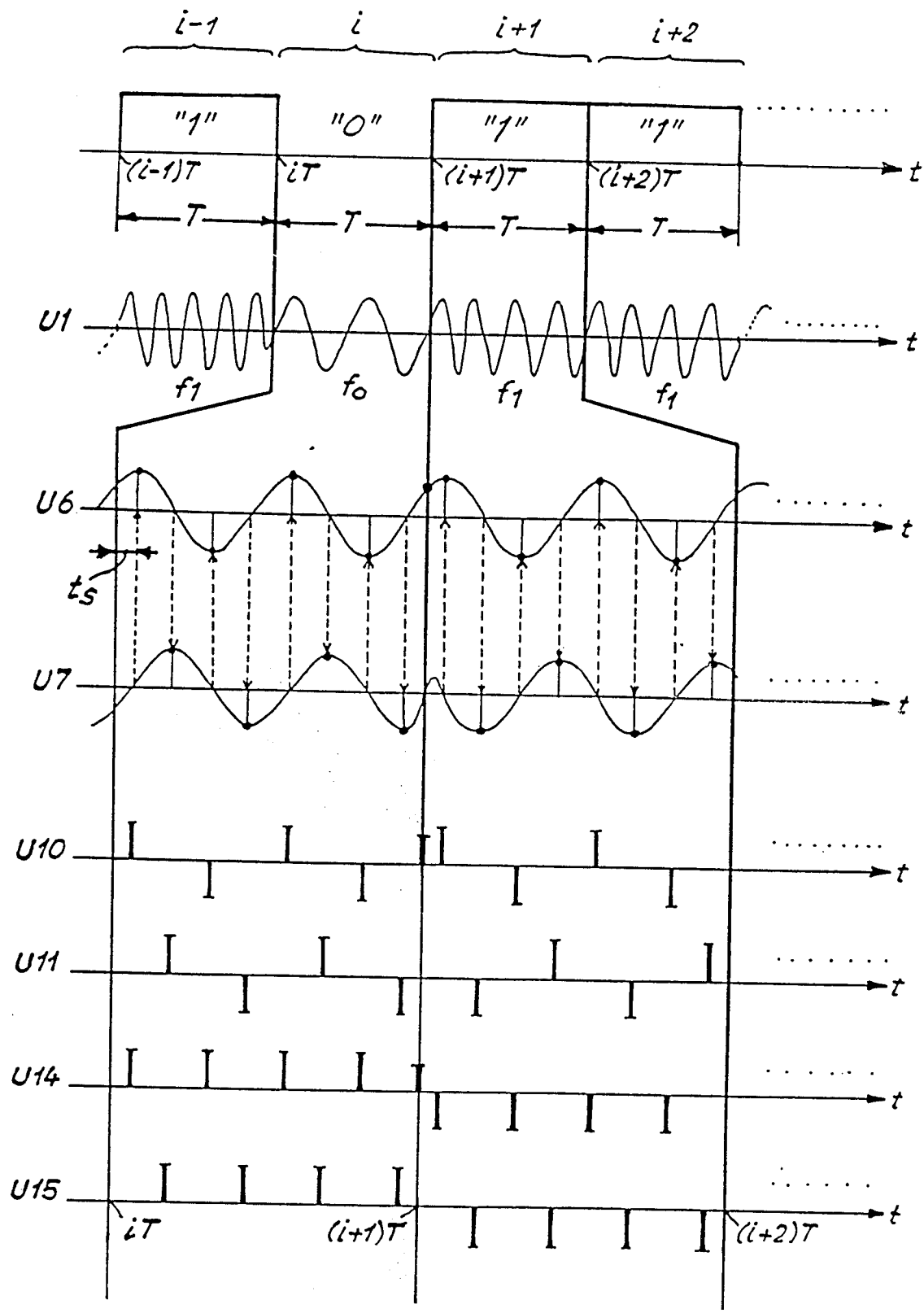
FIG. 2 is a diagram representing the manner of operation of the circuit according to FIG. 1, and shows various electrical signals which depend on time.

The method of operation according to FIG. 1 of the circuit described, and the procedure for detecting the information of the received signal U1 that can be implemented with the circuit, are, e.g., essentially as follows:

The received signal U1, which is modulated by frequency shift keying, has the frequency $f_0$ or $f_1$, depending on whether the received signal represents the information symbol '0' or '1.' Accordingly, the received signal U1 has a binary data sequence. The time duration T of the individual bit intervals is constant and established from the emission side. Thus, T is the bit period. In FIG. 2, at the top, several bit intervals—$i-1, i, i+1, i+2$—of a binary information signal with the symbol sequence '1', '0', '1', '1', as well as the section of the received signal U1 corresponding to this symbol sequence, are represented.

In the mixers 23 and 24, the received signal U1 is mixed with the medium-frequency signal U2 or U3, as applicable, which is generated by the oscillator 25. The mixture products U4 and U5 thus produced have the deviation frequency $\Delta f = f_0 - f_c = f_c - f_1$, where:

$$f_c = \frac{(f_0 + f_1)}{2}$$

is the frequency of the sinusoidal oscillations generated by the oscillator 25. The higher mixture products with frequencies $f_0 + f_c$ or $f_1 + f_c$ are suppressed by the low pass filters 32 and 33, so that the quadrature signals U6 and U7 with the deviation frequency:

$$\Delta f = \frac{(f_0 - f_1)}{2}$$

appear at the outputs of the low pass filters. As already mentioned, the two quadrature signals U6 and U7 are phase-shifted by 90° in relation to one another. If the received signal U1 in a bit interval has the frequency $f_0$ representing the symbol '0,' the sinusoidal oscillation of the first quadrature signal U6 moves on ahead of the sinusoidal oscillation of the second quadrature signal U7 by 90°. If, on the other hand, the received signal U1 in a bit interval has the frequency $f_1$ which represents the symbol '1', the sinusoidal oscillation of the first quadrature signal U6 follows the sinusoidal oscillation of the second quadrature signal U7 by 90°. An ascertainment or estimate of the differing phase positions of the sinusoidal oscillations of the two quadrature signals U6 and U7 is accordingly synonymous with an estimate of the information symbol contained in the received signal U1. Knowledge of the phase position thus unmistakably indicates the information symbol received in each case.

In order to clarify the above, the the two quadrature signals U6 and U7 are represented in FIG. 2 in the bit intervals i and $i+1$. The change in the different phase positions can be clearly seen by the transition from the information symbol '0' to the information symbol '1' in the instant $(i+1)T$. The graphic representation of the quadrature signals U6 and U7 also shows that in reference to the instants $i.T$, $(i+1)T$ and $(i+2)T$, in each of which a frequency shift keying of the received signal U1 occurs or may occur, can have any phase position, so that neither the zero points nor the maxima of one or the other quadrature signal coincides with the instant named. This is represented graphically in FIG. 2 by the time duration $t_s$ at the beginning of the bit interval i.

In practice, undesirable interferences signals override the received signal, for which reason the two quadrature signals U6 and U7 show not only the sinusoidal oscillations indicated in FIG. 2, but, in addition the interference signals, of some frequency or other, which are overriding the sinusoidal oscillations, whereby the amplitudes of the interference signals may under certain circumstances be greater than the amplitudes of the sinuosoidal oscillations. For the detection of the information of the received signal U1, it is necessary to recognize in each bit interval the portion of the oscillations contained in the quadrature signals U6 and U7 which have the frequency $\Delta f$, which is hereinbelow called the useful signal portion.

If the useful signal portion in the quadrature signal U6 is known in the bit interval i, the optimum ML (maximum likelihood) estimation rule for the i-th information symbol is as follows:

$$S = \int_{iT}^{(i+1)T} u_c(t) \cos\left(2\pi \Delta f(t - t_s) - \frac{\pi}{2}\right) dt \begin{array}{c} H_0 \\ \uparrow \\ > \\ = 0 \\ < \\ \downarrow \\ H_1 \end{array}$$

In this formula, $U_c(t)$ indicates the quadrature signal U7 as a function of time, and $\cos(2\pi\Delta f(t-t_s)-\pi/2)$ indicates the useful portion in the quadrature signal U7 that is expected in a transmitted information symbol '0.' T and $t_s$ have the meanings already indicated. The letters S and H stand for 'statistic' and 'hypothesis,' respectively.

If $S \geq 0$, a transmitted information symbol '0' is assumed; otherwise, a transmitted information symbol '1' is assumed.

If this calculation is to be conducted with time-discrete values, e.g., by means of an electronic calculator, the estimation rule is:

$$S_d = \sum_{j=1}^{N=T/T_a} u_c(iT + jT_a) \cdot$$

$$\cos\left(2\pi\Delta f(iT + jT_a - t_s) - \frac{\pi}{2}\right) \overset{H_0}{\underset{H_1}{\overset{>}{\underset{<}{=}}}} 0$$

Where $T_a$ means the sub-period or sampling period at which the quadrature signal U7 is sampled within one bit period T, which occurs N times per bit period.

Thus, according to this estimation rule, the instantaneous value of a bit period T of the quadrature signal U7 is sampled N times; the samples obtained are weighted with fixed coefficients corresponding to the function values of the expected useful signal portion at a transmitted information symbol of '0,' and all N products which have thus been formed are summed up. Everywhere where the amount of the expected useful signal portion is equal to 1, when the transmitted signal is '0,' the samples are given a maximum weighting according to the amount. If, for the estimation, samples at only these points are utilized, the multiplication of the weighting may be replaced by additions and subtractions. Since only those samples which are most heavily weighted in the summation are used for this, the result of this procedure is close to the optimum.

Due to the 90° phase displacement between the sinusoidal oscillations U2 and U3, the useful signal portions of the two quadrature signals U6 and U7 in each case have their maximums and minimums where the useful signal portion of the other quadrature signal U7, or U6, respectively, crosses a zero-point. Instead of detecting the phase of the useful signal of one of the quadrature signals U6 or U7, and thereafter estimating the relative phase position of the useful signal portion of the other quadrature signal U7 or U6, respectively, the instants of the zero-passages of the one quadrature signal U6, or U7, respectively, may be used for controlling the sampling of the other quadrature signal U7, or U6, respectively.

Accordingly, in the circuit according to FIG. 1, the instantaneous value of the first quadrature signal U6 is sampled by means of the first sampler 35, which is controlled by the crossover detector 36, whenever the second quadrature signal U7 passes through a zero-point. Conversely, the instantaneous value of the second quadrature signal U7 is sampled by means of the second sampler 40, which is controlled by the crossover detector 41, whenever the first quadrature signal U6 passes through a zero-point. The sequences of samples U10 and U11, respectively, which are obtained, are represented in FIG. 2. Recognizably, the samples have alternating polarities within a single bit-period.

By means of the controlled polarity inverters 44 and 46, the samples are in part inverted and in part not inverted. The criterion for whether the sample is to be inverted or left uninverted is the direction of the crossover of the other quadrature signal. In the example according to FIG. 2, samples U10 of the first quadrature signal U6 are always inverted whenever the second quadrature signal U7 crosses a zero point from plus to minus; on the other hand, the samples of the second quadrature signal U7 are always inverted whenever the first quadrature signal U6 crosses a zero-point from minus to plus. Accordingly, sequences of samples U14 and U15 with adapted polarities are created at the exit of the polarity inverters 44 and 46, as can be seen at the bottom of FIG. 2. It is recognizable that within the bit interval i, during which the information symbol '0' is transmitted, all adapted samples U14 and U15 have positive polarity, and within the bit interval i+1, during which the information symbol '1' is transmitted, all adapted samples U14 and U15 have negative polarity.

If the received signal U1, and hence also the two quadrature signals U6 and U7, are not free of interference signals, the samples U14 and U15 may indicate differing amounts, and the points in time of the crossovers of the quadrature signals may be irregularly shifted. Since, however, the sinusoidal oscillations have, in each case, the greatest increases at their crossovers, and the sampling occurs at the flattest range of the useful signal portions, the samples obtained in the manner described permit a good approximation of the optimal estimation rule, even in cases of a received signal burdened with static and interference.

In the adder 51, the samples U14 and U15 with adapted polarity values are algebraically added during each bit interval, after which an electrical signal representing the preceding sign of the resulting sum appears at the signal output 52, and an electrical signal representing the amount of the resulting sum appears at the signal output 53. The preceding sign of the resulting sum determines the esimated information symbol '0' or '1,' while the amount of the sum is a measure of the quality of the estimate made.

The control of the adder 51 occurs by means of the timer signal U16 generated by the oscillator 54, which is synchronized with the bit period T. The polarity exchange of the samples U14 and U15 between the sequential bit intervals is used for the synchronization in each case. The samples U14 and U15 are passed to the synchronizer 56 by way of the wires 57 and 58, which compares the instants of the polarity exchange of the samples U14 and U15 with the points in time of the flanks of the timing signal U16, which control the adder 51, and corrects toward zero any deviations which may occur by means of corresponding influence of the phase of the timing signal U16. In this way the chronological coincidence, to a sufficient degree of exactness, of the flanks of the timing signal U16 with the instants i.T, (i+1)T, (i+2)T, etc., between the sequential bit intervals, is achieved.

For the expert it is clear that other measures of circuit technology would be possible for generating the timing signal U16 which controls the adder 51. It would also be conceivable for the timing signal U16 to be transferred from the transmitter, either on a separate control channel, or overriding the received signal U1. Since, however, the present invention has the goal of detecting the information of the received signal U1 even with poor transmission quality, it is to be assumed that the transmission of the timing signal U16 from the transmitter might occur with insufficient quality, and that the estimation of the information of the receiver signal might be negatively influenced. Therefore, the generation of the timing signal U16 at the location of the receiver would be preferred.

In a simplified alternative to the described circuit according to FIG. 1 it is possible to dispense with the second sampler 40, the second crossover detector 41 and the second polarity inverter 46, and simply to generate samples U14 from the first quadrature signal U6, and to add them in the adder 51. Conversely, the sampler 35, the crossover detector 36 and the polarity inverter 44 may be omitted, so that then, only samples U15 from the second quadrature signal U7 are formed in each case at the crossovers through zero by the first quadrature signal U6, and are added in the adder 51. In each of these simplified cases, however, the quality of the estimate of the information of the received signal U1 achieved is of a lesser quality than in the example according to FIG. 1 with cross-control of the sampling of both quadrature signals U6 and U7, because in the latter case, a part of the information loss, which may occur due to the non-ideal character of the point in time of the sample of only one of the quadrature signals, is compensated for.

Finally, it should be noted that the center frequency $f_c$ of the sinusoidal oscillation U2 generated by the oscillator 25 may be located in any frequency range whatsoever; however, the relationship of the deviation frequency:

$$\Delta f = \frac{(f_0 - f_1)}{2}$$

in Hertz to the data rate R in bits per second need only fulfill the condition:

$$\frac{\Delta f}{R} \cong \frac{1}{4}.$$

I claim:

1. Method for detecting binary information in a received signal, comprising initially demodulating said received signal into a first quadrature signal and a second quadrature signal which is phase shifted by 90 degrees, converting each of said first and second quadrature signals into a sequence of samples corresponding to the amplitude and polarity of the associated quadrature signal at instant of the sampling, whereby the instant of the sampling is controlled dependent on the crossover of the other quadrature signal in each case; inverting or non-inverting the polarity of the samples obtained, dependent upon the directions of the crossovers of the other quadrature signal in each case; whereby the inversion of samples of the first quadrature signal and the inversion of the samples of the second quadrature signal occurs, in each case, at opposite directions of the crossovers of the second quadrature signal and the first quadrature signal, to generate samples with adapted polarities within each individual information bit interval of the received signal from both quadrature signals; summing all samples with adapted polarities within each individual information bit interval of the received signal, and evaluating the preceding sign of the resulting sum as an estimate of the received binary information symbol.

2. Method according to claim 1, wherein the amount of the resulting sum of all samples with adapted polarities within an information-bit interval of the received signal is evaluated as the standard of quality of the estimate of the received binary information symbol.

3. Electrical circuit for detecting binary information in a received signal, comprising circuit elements for demodulating a received signal into a first quadrature signal and a second quadrature signal which is phase-shifted by 90 degrees from said first quadrature signal, conversion means for converting each of the quadrature signals into a sequence of samples, corresponding to the amplitude and polarity of the quadrature signal existing at the instant of the sampling; means for controlling the instants of the sampling, dependent on the crossover through zero of the other quadrature signal in each case; means for inverting a portion of the samples obtained dependent on the directions of the crossovers through zero of the other quadrature signal in each case, such that the inversion of the samples of the first quadrature signal occurs, in each case, at oppositie directions of the crossovers through zero of the second quadrature signal and the first quadrature signal, to generate within each individual information bit interval of the received signal, samples with adapted polarities, from both quadrature signals; means for adding all samples with adapted polarities within each individual bit interval algebraicially; and means to generate an output signal which signals have the preceding sign of each resulting sum, which represents an estimate of the received binary information symbol.

4. Circuit according to claim 3, wherein the means for converting each quadrature signal into a sequence of samples are instantaneous value samples for sampling the first and second quadrature signals, respectively, and means for controlling the instants of the sampling are two crossover detectors for ascertaining the crossovers through zero of the first and second quadrature signals, respectively, whereby the control signals generated by the crossovers of the first quadrature signal are passed to the instantaneous value sampler for the second quadrature signal, to control the instantaneous value sampler, and the control signals generated by the crossovers of the second quadrature signal are passed to the instantaneous value sampler for the first quadrature signal, to control the latter-mentioned instantaneous value sampler.

5. Circuit according to claim 4, wherein the means for inverting a portion of the samples include two polarity inverters controllable by control signals, for the samples of the first quadrature signal, and the samples of the second quadrature signal, respectively; and the crossover detectors generate a control singal for the polarity inverters, dependent upon the direction of the crossovers through zero of the second and first quadrature signals, respectively.

6. Circuit according to claim 3, wherein the means for algebraic adding of the samples with adapted polarities is an adder controllable by a timing signal, with entries for the samples derived from the first and second quadrature signal, respectively, and with an output for the output signal which indicates the polarity of each sum; and means for generation of the timing signal in correspondence with the instants of the beginning and the end of each information bit interval of the binary information of the received signal.

7. Circuit according to claim 3, wherein the means for algebraic addition of the samples with adapted polarities also generate a second output signal which indicates the amount of the resulting sum in each case and represents the quality of the estimate of the received binary information symbol.

8. Circuit according to claim 4, wherein the means for algegraic adding of the samples with adapted polarities is an adder controllable by a timing signal, with entries for the samples derived from the first and second quadrature signal, respectively, and with an output for the output signal which indicates the polarity of each sum; and means for generation of the timing signal in correspondence with the instants of the beginning and the end of each information bit interval of the binary information of the received signal.

9. Circuit according to claim 5, wherein the means for algebraic adding of the samples with adapted polarities is an adder controllable by a timing signal, with entries for the samples derived from the first and second quadrature signal, respectively, and with an output for the output signal which indicates the polarity of each sum; and means for generation of the timing signal in correspondence with the instants of the beginning and the end of each information bit interval of the binary information of the received signal.

10. Circuit according to claim 4, wherein the means for algebraic addition of the samples with adapted polarities also generate a second output signal which indicates the amount of the resulting sum in each case and represents the quality of the estimate of the received binary information symbol.

11. Circuit according to claim 5, wherein the means for algebraic addition of the samples with adapted polarities also generate a second output signal which indicates the amount of the resulting sum in each case and represents the quality of the estimate of the received binary information symbol.

12. Circuit according to claim 6, wherein the means for algebraic addition of the samples with adapted polarities also generate a second output signal which indicates the amount of the resulting sum in each case and represents the quality of the estimate of the received binary information symbol.

13. Circuit according to claim 8, wherein the means for algebraic addition of the samples with adapted polarities also generate a second output signal which indicates the amount of the resulting sum in each case and represents the quality of the estimate of the received binary information symbol.

14. Circuit according to claim 9, wherein the means for algebraic addition of the samples with adapted polarities also generate a second output signal which indicates the amount of the resulting sum in each case and represents the quality of the estimate of the received binary information symbol.

* * * * *